United States Patent

Schlesinger et al.

[15] 3,647,959
[45] Mar. 7, 1972

[54] SYSTEM FOR GENERATING A HOLOGRAM

[72] Inventors: Robert J. Schlesinger, 5108 Melvin Avenue, Tarzana, Calif. 91356; George A. Raabe, Santa Barbara, Calif.

[73] Assignee: Robert J. Schlesinger, Tarzana, Calif.

[22] Filed: June 24, 1968

[21] Appl. No.: 739,424

[52] U.S. Cl. .................. 178/7.87, 178/6.5, 178/7.5 D, 313/91, 350/3.5, 350/160 P
[51] Int. Cl. ........................... H04n 5/74, H01j 29/14
[58] Field of Search .................. 178/6.5, 7.87, 7.5 D, DIG. 3, 178/DIG. 31; 350/3.5, 160 P; 313/91

[56] References Cited

UNITED STATES PATENTS

| | | | |
|---|---|---|---|
| 2,418,779 | 4/1947 | Leverenz | 178/7.87 |
| 2,418,780 | 4/1947 | Leverenz | 178/7.87 |
| 2,481,622 | 9/1949 | Rosenthal | 178/7.87 |
| 2,563,472 | 8/1951 | Leverenz | 178/7.87 |
| 3,181,170 | 4/1965 | Akin | 178/7.5 D |
| 3,218,390 | 11/1965 | Bramley | 178/7.87 |
| 3,253,497 | 5/1966 | Dremer | 350/160 P |
| 3,388,396 | 6/1968 | Rope | 350/3.5 |
| 3,440,621 | 4/1969 | Knapp | 178/7.87 |
| 3,444,316 | 5/1969 | Gerritsen | 178/6.5 |
| 3,467,216 | 9/1969 | Massey | 350/3.5 |
| 2,306,407 | 12/1942 | Rosenthal | 178/7.87 |
| 2,409,606 | 10/1946 | Leverenz | 313/91 |
| 2,473,825 | 6/1949 | Smith | 178/7.87 |
| 2,836,753 | 5/1958 | Hodowanec | 313/91 |
| 3,403,283 | 9/1968 | Chernow | 178/7.5 D |
| 3,499,703 | 3/1970 | Debitetto | 178/DIG. 31 |
| 3,531,589 | 9/1970 | Collier | 178/DIG. 3 |
| 3,544,711 | 12/1970 | Debitetto | 178/6.5 |
| 3,548,236 | 12/1970 | Kiss | 313/91 |
| 3,552,824 | 1/1971 | Kiss | 350/160 P |
| 3,148,281 | 9/1964 | Fyler | 313/91 |
| 2,330,171 | 9/1943 | Rosenthal | 178/7.87 |

OTHER PUBLICATIONS

Leith, Upatnieks, Hildebrand & Haines, Requirements for a Wavefront Reconstruction Television Facsimile System, Jour. of the Society of Motion Picture and TV Engineers, Vol. 74, No. 10, Oct. 1965, pp. 893–896

The Sound of Holograph is Ultra, Einhorn, Electronic Design, Sept. 13, 1967, Vol. 15, No. 19, pp. 17, 18, 21

Gerritsen, Bosomworth, Thick Holograms in Photochromic Materials, Applied Optics, Vol. 7, No. 1, Jan. 1968, pp. 95–98

Ramberg, The Hologram, Properties and Applications RCA Review, Dec. 1966, pp. 479–481

*Primary Examiner*—Robert L. Griffin
*Assistant Examiner*—Joseph A. Orsino, Jr.
*Attorney*—Griffin, Branigan and Kindness

[57] ABSTRACT

A hologram is generated by first providing a holographic signal representing scanning of a standing wave interference pattern. The signal controls generation of local perturbations in a target usable as modifier for monochromatic coherent radiation to cause reconstruction of an image.

1 Claims, 11 Drawing Figures

Patented March 7, 1972 3,647,959

INVENTORS:
Robert J. Schlesinger
George A. Raabe

ATTORNEYS

Absorption Coefficient

Refractive Index

INVENTORS:
Robert J. Schlesinger
George A. Raabe

ATTORNEYS

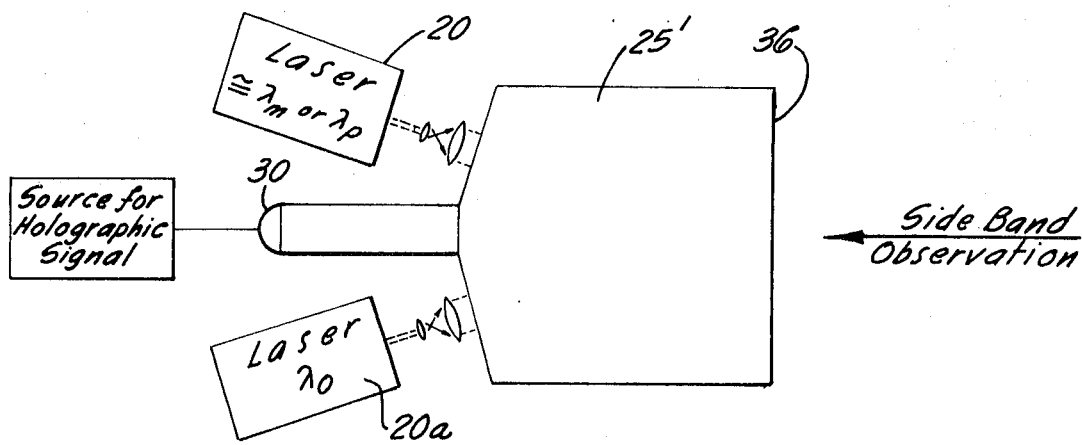
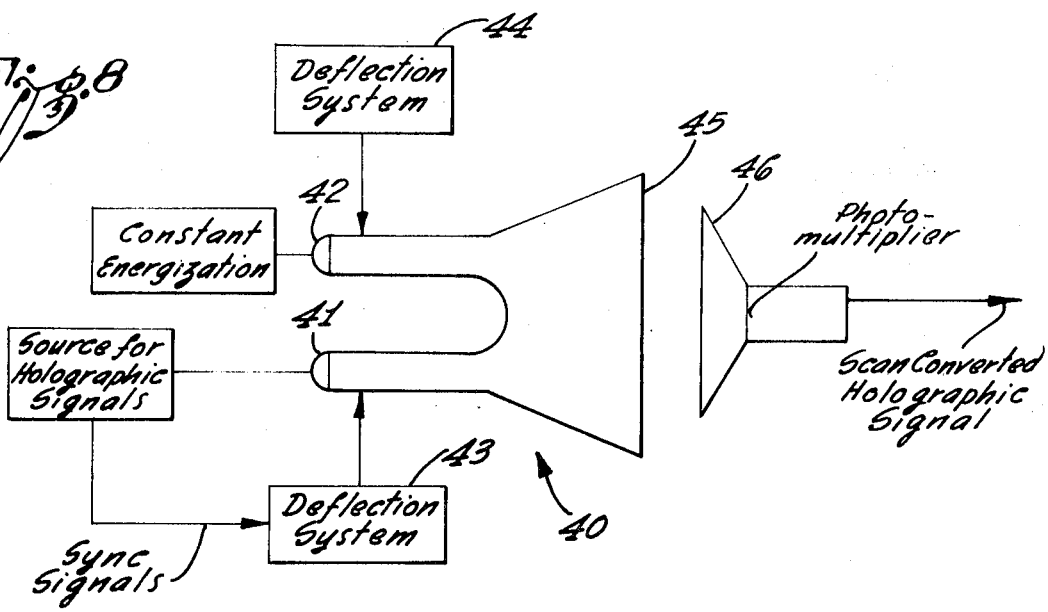

Patented March 7, 1972
3,647,959
4 Sheets-Sheet 4
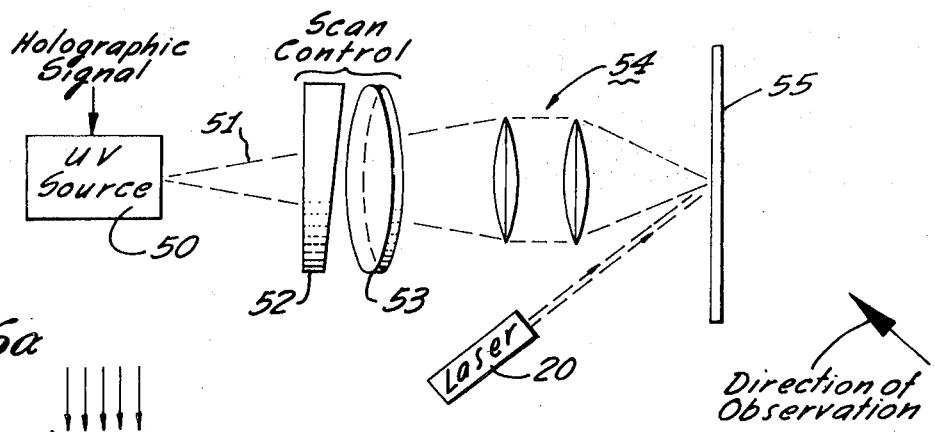
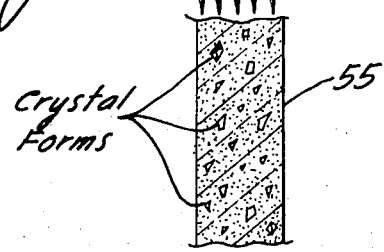
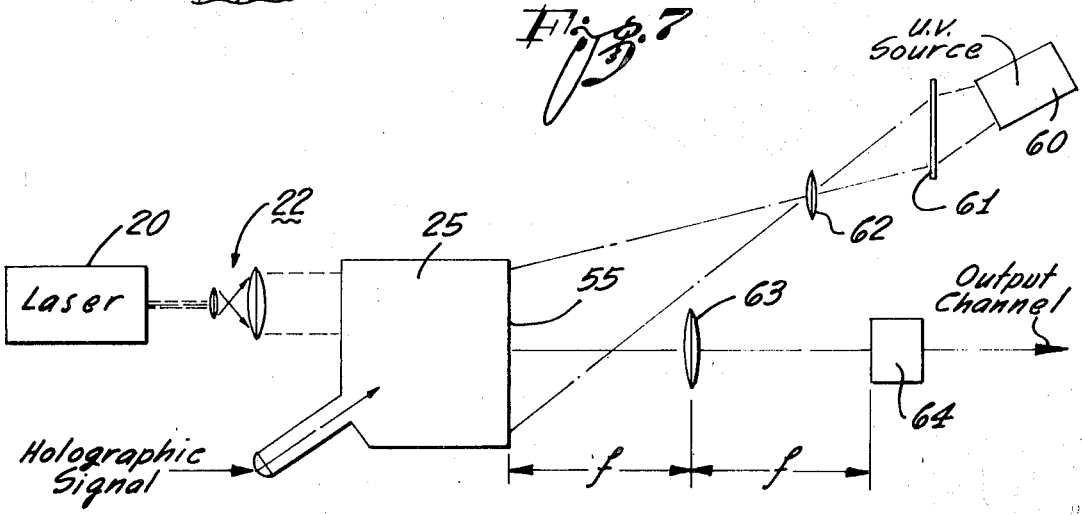
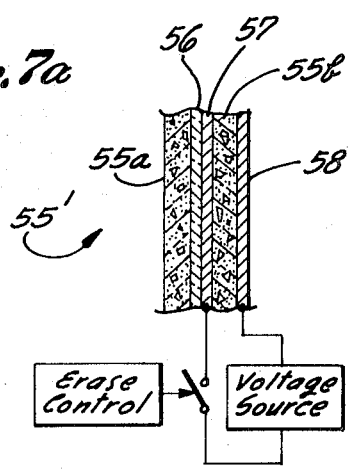
INVENTORS:
Robert J. Schlesinger
George A. Raabe
ATTORNEYS 3,647,959

SYSTEM FOR GENERATING A HOLOGRAM

The present invention relates to holography and more particularly to indirect generation of a hologram and to object-image reconstruction therefrom. The principles of holography are well established. Briefly, monochromatic radiation irradiates an object which scatters some of the radiation as it is being transmitted or reflected by the object and thereby spatially modulates the phase of wave front increments such radiation. Undisturbed radiation serves as a reference to interfere with the radiation as modulated by the object, resulting in spatially distributed standing wave interference pattern. Photographic recording of the interference pattern, for example, samples a plane of the three-dimensional region where the interference occurs which results in a hologram. More generally, a hologram can be regarded as a recording of the nodes and antinodes of the always three-dimensional standing wave interference pattern along a line, in a plane, or within a volume of and within the region where the pattern occurs. As a consequence, a line, a plane or a volume hologram will be produced.

Usually one distinguishes among Fresnel, Fraunhofer, Sideband and Fourier transform holograms. Another classification distinguishes between in-line or off-axis reference holograms. The distinction of different types of holograms rests essentially on features such as the contour of the wave fronts employed (spherical or planar), including the employment of wave front modifiers such as lenses, pinholes, etc. Other classifying features are the angle between object-modulated and reference beam and the distance relationship between object, radiation source and hologram plane. The invention is applicable to all these types of holograms. For image reconstruction, the photographic recording of the hologram (transparency) is placed into a coherent beam of light, and an image (or several) of the original object is produced thereby.

For practicing holography two points are essential. First, manifestations of the spatially distributed nodes and antinodes of an interference pattern must be provided. (This includes the actual physical generation of an interference pattern and recordation of at least parts thereof, as well as algorithmic, symbolic generation of an interference pattern and, for example, a digital representation thereof.) Second, the manifestations must be amenable to recording (or constitute a recording itself) in such a physical configuration that the resulting record is capable of scattering coherent radiation for reconstructing wave fronts as, or in representation of, an image reconstruction process.

It is a primary object of the present invention to provide manifestations of nodes and antinodes of an interference pattern as well as wave front reconstruction from and by means of a holographic record in a real-time relationship.

It is another object of the present invention, to provide an erasable record of a portion of an interference pattern usable directly for scattering of coherent light and wave front reconstruction therewith.

It is another object of the present invention to provide directly a record of an interference pattern capable of scattering coherent radiation having frequency and/or quality different from the radiation which produced the standing wave interference pattern (the different qualities available being, electromagnetic and mechanical).

It is a further object of the present invention to provide a holographic record without processing delay (such as is inherent in the developing of a photographic recording). It is a still further object of the present invention to constitute or reconstitute a hologram at a location displaced or remote from the region occupied by the standing wave interference pattern, including the providing of means for surveying a geometrically defined area or region within the region occupied by a standing wave interference pattern and further including plotting and mapping of a hologram in response to and preferably in real-time relation or synchronism with progression of surveying, the mapping to be executed in a manner permitting immediate utilization as a modality for modulating coherent light for the purpose of real-time wave front reconstruction.

In accordance with one aspect of the present invention in the preferred embodiment thereof, a holographic signal is to be developed as the time signal analog of a one-dimensional line hologram, whereby the "line" represents a one-dimensional representation of a line scan, of a planar raster scan, or of volume raster scan of the interference pattern by means of a "point" sensor. Thus, a holographic signal is developed by sensing at any instant the radiation intensity in a very small area (point) as local representation of the spatial distribution of nodes and antinodes establishing the interference pattern as between object modulated beam and reference beam. Upon varying that "point" of sensing pursuant to a scanning operation the spatial distribution of nodes and antinodes of the standing wave pattern is surveyed within a particular region, and the detector produces a time varying holographic signal in representation of this detection and surveying process. The resulting signal train is the scan signal analogue of a hologram if one had been taken in that particular region. Accordingly, that holographic signal is produced in lieu of the taking of the conventional hologram.

The "point of sensing" covers a particular region (a line, a plane, a volume) completely, whereby the total size of that region must be sufficiently large, so that a hologram, if one were taken in that region, would have interference pattern elements sufficient for an image reconstruction process. The scanning line density is determined by the required resolution. The interference pattern is scanned repeatedly if the object changes or moves.

The radiation source can be of any kind which emits monochromatic radiation capable of producing interference. The radiation may be electromagnetic waves or mechanical vibrations. Correspondingly, the scanner is a transducer responding to that type of radiation within a very small region of the region to be scanned. The dimensions of the transducer defines at any instant the resolution of the hologram ultimately to be produced, and the transducer or a transducer system line scans the interference pattern within a particular area of a particular region where the object-modulated radiation interferes with modulated coherent reference radiation.

The holographic signal is preferably an electrical signal which is amenable to immediate transmission to a remote location, or it can be recorded if that is desired. Wherever that signal is received by the practice of this invention, a true hologram is constituted or constructed from the time varying holographic, electric signal, and the image is reconstructed from the hologram more or less concurrently thereto. Remote construction of a hologram can be defined generally to mean construction remote from the region of the standing wave interference pattern. This remote construction of a hologram and the reconstruction of an image essentially concurs with the production of the holographic signal itself. Thus, object and reproduced image have a real-time relationship.

The image of the object is thus constructed in a remote location in two essentially concurring steps. In the first step the hologram is constituted, possible for the first time, as a representation of a two-dimensional (or one-or three) dimensional interference pattern; in the second step that spatial representation is used as a hologram to reconstruct the image. In particular, the holographic signal is used to control a beam of radiant energy such as an electron beam which is deflected in accordance and synchronously with the scanning pattern of the transducer.

The electron beam impinges upon a target or screen which can be described generally as a susceptor. The susceptor is a medium which is capable of undergoing local variations, for example, of its optical frequency propagation characteristics upon interaction with an electron beam. Preferably, such susceptor will be a material which is essentially transparent, (or specularly reflective) at least for the wavelength used for image reconstruction. Furthermore, in the preferred form of practicing the invention, a susceptor is used wherein upon interaction with an electron beam the index of refraction and/or transmitivity (or its reflectivity) is modified. For example, so-called color centers are generated. The hologram is thus mapped by raster scanning this particular susceptor screen with the electron beam in synchronism with the surveying of the region of the standing wave interference pattern. The hologram is completed when the transducer surveying the area or region in which the wave interference pattern is occurring, has completed its scanning run.

The susceptor screen with hologram written thereon is irradiated from a source of monochromatic, coherent wave energy. The waves from the source are modulated by the now spatially distributed optical propagation characteristics. For practical reasons, visible light will be used for such image reconstruction; this, however, is not essential in principle. In case of a sideband hologram, a virtual image can be observed without further aid by looking at the screen at an angle. If the image is a real one, a light intercepting screen may be required, or a viewing ocular assembly or a pupil-positioning head rest can be used for direct observation. The image could also be photographed or processed further, for example, with a matched holographic filter.

The interaction between susceptor and electron beam should be such that resulting local changes in optical propagation characteristics of the susceptor material are erasable. Color centers usually are erasable in that the color centers can be bleached away either by heat and/or radiation or by an electrostatic field or by a combination thereof. Alternating write or recording and bleaching cycles thus produce a real-time hologram sequence commensurate with changes of the object.

Color centers can be created in various ways, and employment of an electron beam is just one of them. Nevertheless, an electron beam is a very convenient modality to map or plot a one or more dimensional hologram in response to a single signal train, and the single signal train results from real-time detecting and surveying nodes and antinodes of and within the standing wave pattern. Development of a signal train as a time analog of a hologram is required wherever the place of reconstructing an image is displaced or remote from the region occupied by the standing wave pattern and delay of photographic processing cannot be tolerated, particularly where the object observed changes shape, position, etc. If, however, spatial distribution of nodes or antinodes are available, or directly reproducible, as, for example, a two-dimensional energization field capable of creating color centers, the node-antinode pattern can be generated by that field directly, without scanning.

Aside from using the generation of color centers as the tool for constituting a hologram from an electrical signal, one could use cathodophotochromic layers or a cathodocholesteric membrane. These types of targets are likewise erasable thermally. In cases where erasing is not essential, or where the delay of development can be tolerated, the remote constitution of a hologram may employ a cathodozerographic layer, a cathodophotopolymer, a cathodophotovesicular film or even a photographic silver halide emulsion as susceptor screen or target.

The principal advantages of the system are, among others, that wave front reconstruction can be observed, examined or analyzed remote from the detection zone. The holographic signal can be processed electronically, if desired, such as heterodyning, digitizing, clipping, filtering, shaping, distorting, inverting, rectifying, etc. The holographic signal may even be synthesized, for example, by a computer. The standing wave and interference pattern can be generated in a manner most suitable under the circumstances, using particularly the most practical, economical, or otherwise most suitable type of radiation such as microwaves, infrared, visible light, UV radiation or even ultrasonic vibrations. The only limiting factor here is availability of coherent sources, possibility and ease of scanning, and available modes of interaction with the object. Otherwise, any type (qualitatively) of wave energy is suitable, as long as a source for coherent waves thereof is available.

Most importantly then, the principles of the invention lend themselves to the establishing of a "converter" for converting the most suitable type of standing wave pattern representing an object to a hologram for a type of image reconstruction most suitable for the desired hologram evaluation process. For practical purposes the latter process will use visible light in most instances, while the former process will depend mostly on the environment of the object and its structure. As an example, ultrasonic vibrations can be used with advantage to generate an interference pattern in representation of the interior of the human body, the image reconstruction then permits visible, three-dimensional inspection.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

FIG. 4 illustrates somewhat schematically an alternative construction for a tube to accommodate a particular erasing system;

FIG. 6 illustrates schematically a system for producing a hologram without an electron beam;

FIGS. 6a and 7a illustrate cross sections through a susceptor screen permitting multilayer hologram plottings;

FIG. 7 illustrates schematically a plural hologram mapping arrangement particularly for practicing matched filter techniques; and FIG. 8 illustrates somewhat schematically a scan-converter usable as a transmission link between a holographic signal generator as shown in FIG. 1, and a reproducing system as shown in FIG. 2.

Figure 1:
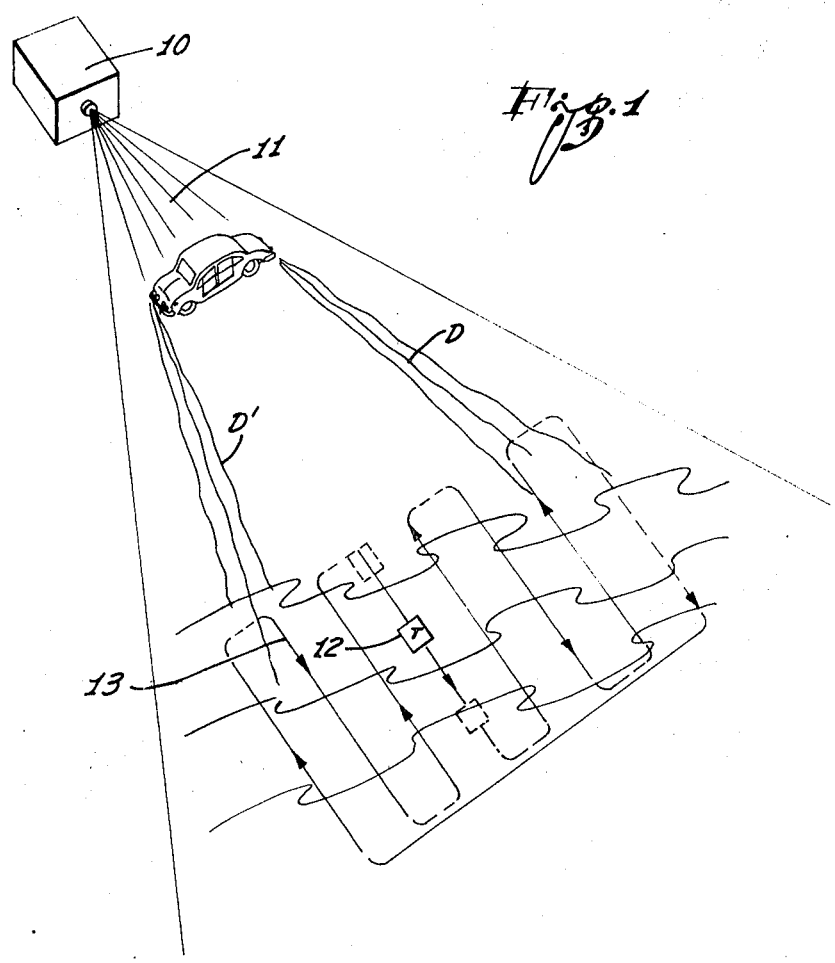
FIG. 1 illustrates somewhat schematically the production of a holographic signal.

Proceeding now to the detailed description of the drawings, in FIG. 1 thereof, there is illustrated a source of monochromatic wave energy 10. This, for example, may be a wide angle source for single frequency-ultrasonic vibrations or electromagnetic microwaves, having frequency in the megacycle range, or the like. The wavelength, for example, will be below 1 millimeter which is sufficiently small to allow resolution for details in most macroscopic objects, almost comparable with a direct observation with the unaided eye.

The figure is schematic in nature but lends itself readily to the explanation of several different cases. In the first case it is believed that the radiation cone covers a relatively large region and there is an object to be observed, whereby the contour of the object is the feature of interest. If that object is spaced from source 10 at a distance sufficient not to fill completely or to exceed the cross-sectional area of the radiation cone in the plane of the object, the object will operate primarily to obscure for an "observer" on the side of the object facing away from source 10.

Therefore, coherent monochromatic wave propagates essentially undisturbed where passing object at sufficient distance while the object itself operates as an obscuring mask. Radiation is diffracted along the contour of the object producing wavelets such as denoted schematically at D and D'. These diffracted wavelets will interfere with the undisturbed radiation so that a standing wave and interference pattern is set up in a region on the shadowed side of the object.

A transducer 12 scans a particular area 13 in a line raster within a suitably selected plane of the standing wave interference pattern. If the object is relatively immobile or moves relatively slow, scanning may well be understood as a physical motion on the part of transducer 12 across the area 13. The transducer monitors the local nodes and vibration maxima (antinodes) of the resulting standing wave pattern along its scanning path. The transducer produces an electrical signal proportional to the local vibration or oscillation amplitudes within its resolution capability, as essentially defined by the dimensions of its pressure responsive element. If the standing waves are ultrasonic vibrations, transducer 12 includes a pressure responsive element to detect nodes and antinodes as local pressure variations. If the standing waves are electromagnetic microwaves, transducer 12 will be an antenna.

The path of the transducer within the region occupied by the standing wave interference pattern defines the holographic significance of the signal. If the transducer is limited to motion along one line, back and forth, a line hologram signal will be generated. If the transducer raster scans an area, a line scan signal representative of a two dimensional Gabor-type in-line hologram will be generated. The holographic signal will be in representation of a Fresnel hologram or of a Fraunhofer hologram, depending on the distance of the source from the object. If a second ultrasonic source of like frequency were used to direct undisturbed radiation towards region 13 from a different angle, a sideband hologram pattern is established. Great care must be taken to obtain phase lock between two different sources, as otherwise a standing wave pattern will not result. For practical reasons, such two phase-locked sources can be regarded as a single source with two differently located outlets.

If, for example, during such a line scan run for a two-dimensional raster scan the transducer oscillates rapidly back and fourth for a short distance and in direction transverse to its principal travel path, a volume holographic signal will be generated. It will be appreciated that with multiple transducers, physical motion of a single transducer can, partially at least, be substituted by sequencing of the several transducers.

The output signal of transducer 12 may be suitably processed for transmission, depending essentially on the distance for such transmission. Hence, the electric output circuit of the transducer 12 may include amplifier and/or carrier modulation stages, equalizers, digitizers, RF transmitters, coax cables, etc., or where scanning is slow and utilization for the signal is rather close, a simple wire or cable may suffice, the signal to be transmitted should include additionally control signals representative of the scanning process.

The second case to be discussed with reference to FIG. 1 is that radiation source 10 is presumed to be a strong ultrasonic radiation, preferably operating at optionally selected frequencies such as 1 MHz. to 5 MHz. to exploit the dispersive properties of the body, so that ultrasonic vibrations propagate through the body of a person taken as the object. Scattering interactions occur in the interior of the body of the person with selective and characteristic modes at each of the various accoustic media represented by the specialized tissues, organs, bones, etc. As the thus redirected ultrasonic waves interfere with undisturbed ultrasonic waves outside of the body, the time analog of a hologram of the interior body of the person is produced upon scanning the interference pattern as described. A sideband-type hologram will preferably be produced in this case if a virtual image is to be observed, requiring an off-axis reference beam.

A third case which can be discussed in relation to FIG. 1 is that 10 is a source for a narrowly bundled radar beam and transducer 12 is affixed to source 10, both moving along a particular path, for example, because they are mounted to an airplane. In this case, transducer 12 is an antenna detecting microwave nodes and antinodes of the interference pattern resulting from interference of the microwaves as reflected by an object and the unreflected waves from the source. The distance over which the airplane moves during the travel time of a wave from source 10 to object and back, is the effective aperture of the source for this particular case. The transducer-antenna output signal is representative of a true line hologram.

Figure 2:
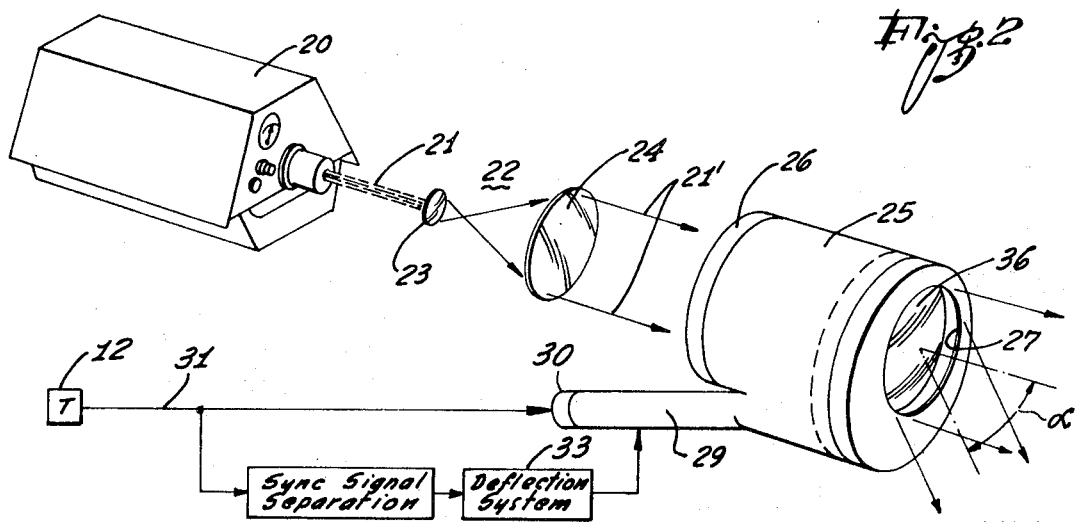
FIG. 2 illustrates in perspective view the general layout of a system for producing a hologram from a holographic signal and for concurrently reconstructing the image therewith.

Proceeding now to the description of FIG. 2, there is shown, as stated above, a system for hologram constitution an image reconstruction. The system basically comprised of a source 20 for monochromatic, coherent waves. Nothing precludes employment of any type of wave energy, but for practical purposes source 20 will emit visible light; source 20 is, for example, a laser. A pencil beam 21 is emitted by laser 20. For reasons to be explained more fully below, but not necessarily, this may be a krypton laser emitting light at a wavelength of 0.5208 microns or 0.5683 microns. The pencil beam 21 is increased in diameter by a beam expander 22 having a small front lens 23 for receiving the pencil beam. A wide diameter exit lens 24 aligned with lens 23 produces a wide diameter beam 21'. The beam 21' may be collimated or divergent.

Beam 21' enters a cathode ray tube 25 through a rear port 26 thereof. The tube 25 will be explained in greater detail more fully below and with reference to FIG. 3. Briefly, tube 25 has a neck portion 29 which includes an electron gun 30 receiving so-called Z axis modulation or intensity controlled signals through an input channel 31. Transducer 12 is coupled to channel 31 through a suitable transmission means which may be a simple wire or a coaxial cable, depending on the scanning speed, i.e., on the bandwidth of the signal to be transmitted. The link between transducer 12 and electron gun 30 may, of course, be more elaborate, including, as was mentioned above, amplifiers, carrier modulation with demodulation at the input of gun 30 and suitable long range signal transmission facilities if that is needed.

As stated above, the signal as received from the interference pattern detecting, scanning and surveying arrangement (FIG. 1) should include suitable synchronization signals to control the deflection system 33 of the electron gun 30. Tube 25 has an exit window 27 wherein there is a particular screen 36 on which the electron beam of the CRT 25 "writes" a hologram. As will be described by way of example below, screen 36 must be amenable to be perturbed by the electron beam and in a manner that the perturbations modulate the wave fronts as emitted by the particular source employed. It is an important aspect of the invention that the delay between the interference pattern surveying and scanning as conducted by the transducer, and the writing process by the electron beam, results solely from transmission of electric signals and is thus very small indeed.

If the hologram is, for example, of the sideband-type, a virtual image of the object can be seen by observing that window 27 at the angle $\alpha$ in relation to the propagation of the laser beam; in this case angle $\alpha$ is the angle of interception between the centers respectively of the reference beam and of the modulator beam if a sideband-type hologram pattern has been detected by transducer 12 (FIG. 1). The angle of observation may depend also on the orientation of the scanning plane in which the transducer scans and surveys the interference pattern, and the screen 36 in tube 25 on which a hologram is written by the electron beam, can be oriented at right angles or obliquely to the beam of monochromatic light entering the tube through rear port 26.

In general, the light beam 21' entering tube 25 through rear port 26 and leaving it through front port 27 interacts with the layer defining screen 36. The interaction results generally in a wave front modulation as well as one or more localized diffraction patterns. Corresponding to a projective mathematical model, the diffracted lightwave propagates, appearing to be coming from or arriving at certain positions of space, either within the tube or outside where reconstruction of optical images are produced. These produced images can then be examined either by unaided human visual processes, by optical instruments, or optical sensor systems, and processors disposed at the right-hand side of the tube, adjacent the exit window 27 thereof.

Figure 3:
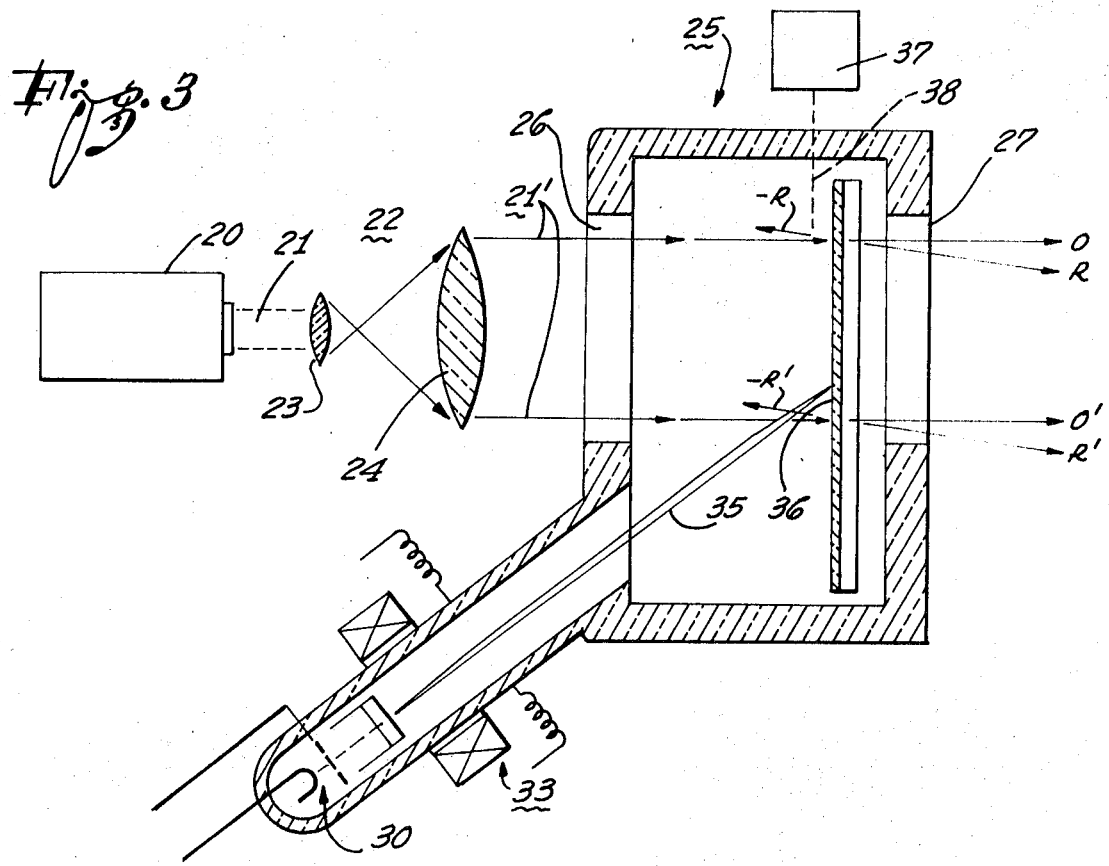
FIG. 3 illustrates a cross section through a cathode ray type tube employed in the system shown in FIG. 2, together with a schematic showing of associated elements for hologram constitution and object image reconstruction.

A cross-sectional view through and into the tube 25 is illustrated more fully in FIG. 3. For reasons of facilitating orientation, the beam expander 22 and the laser 20 are illustrated also. The electron gun 30 is conventionally constructed and so is the deflection system 33, except that extremely sharp focusing is required, down into the micron range as to beam contraction at or near the intercepting screen 36. The resulting sharply focused electron beam 35 impinges upon the layer 36 forming the target screen of CRT 25, and upon deflection of the electron beam, progressive regions of that layer interact with the beam.

The electron beam is adjusted to have its smallest cross section occur either at the position of exact impingement on the layer 36 or its position is removed on either side of the impingement position and for a small adjustable increment of distance. As the beam is directed obliquely upon target screen 36, the focusing circuit should be coupled to the deflection circuit to increase the focal length of focusing when the beam intercepts the target screen at more remote points. However, the drawing is schematic in nature and for a longer distance between the entrance and exit ports of the tube, the lateral neck with the electron gun may be oriented, that the gun directs the beam at a very steep angle everywhere onto the target so that variable focusing is not needed.

Of critical importance is the consistence of layer 36. Here it is particularly essential that the material exhibits variations of its optical light propagation characteristics where having interacted with electron beam 35. The resulting perturbations should cause a monochromatic beam to be modulated. For example, the perturbations should be centers of localized absorption and/or centers for a localized change in phase (transmission speed) and/or localized reflectivity, in relation to waves passing through (or being reflected by) portions of the screen where the optical propagation characteristics were not perturbed, so that diffraction-type scattering can occur.

In accordance with the preferred form of practicing the invention the target layer 36 should meet at least one of the following criteria. (1) The material should undergo perturbations of a characteristic which is related to its interaction with wave energy, at least for one wavelength of such radiation; such characteristics being, for example, transmitivity, transmission speed (index of refraction and/or thickness) or reflectivity. (2) Such perturbations should be localized, i.e., restricted to a region of interaction with the energizing radiation, i.e., there should be little or no "spreading" of the perturbations. (3) The perturbations should be stable, and preferably maintainable without creation of a specific environment. For example, the perturbations should be stable at room temperature, at least for the length of time needed for inspection, examination, processing, etc., as the case may be. This condition may become unimportant if holograms are written and erased on the target in alternating rapid cycles. (4) The perturbation of the required optical transmission characteristics in the layer should occur instantly, i.e., upon electron impingement without requiring a developing process. (5) The perturbations should be erasable by any convenient means. In cases this criterium may be supplanted by the stricter requirement of fast erasability.

It has been found that ionic crystals constitute suitable material for targets. It is well known and has been used otherwise that ionic crystals, e.g., a layer of alkali halide crystals interact with energizing radiation such as electron beams UV, X-rays, etc., in that halide vacancies trap electrons forming neutral alkali atoms within the lattice structure. The neutral atoms exhibit additional absorption bands which are not present in the ionic crystal without such trapped electrons. One of the most important absorption bands is often called the F band, and has been observed in form of so-called color centers in the crystals. Therefore, such a layer, when used as a target or screen 36, is readily darkened by fast electrons in a cathode ray tube.

Color centers, at least in some material, are sufficiently stable, erasable, and can be localized. Their size is believed to be about 50 A., which is the equivalent of a resolution of 20,000 lines per millimeter. If holographic image reconstruction is carried out with visible light, this potential resolution is more than can be utilized with radiation having larger wavelength.

Figure 4A:
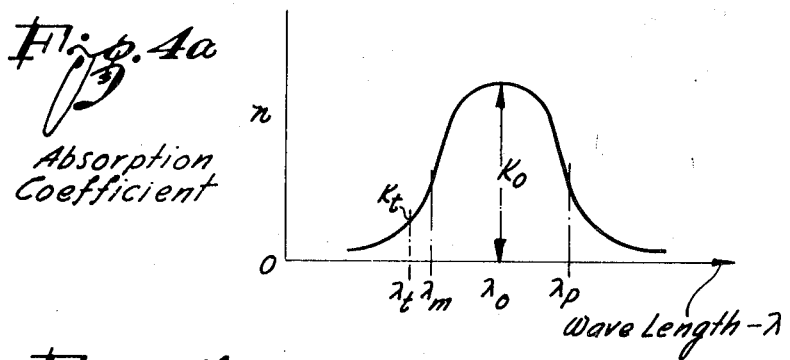
FIGS. 4a and 4b are graphs for illustrating optical propagation characteristics of suitable susceptors used in the tube shown in FIG. 3.

Particularly suitable is, for example, a layer of KCL or KBR having a thickness of a few microns. Color centers are produced by trapping of electrons in chlorine or bromium ion holes within the lattice structure. If the absorption properties of color centers are used, the crystal layer should have many defects, produced preferably without doping, as halide ion vacancies are potential color centers. For best results as to absorption, the layer is provided as an aggregate of small crystals in the form of a crystallite layer with linear dimensions of from 2 to 4 microns. Such a layer may, for example, be produced by depositing of vacuum evaporated alkali-halide. An electron beam of given density and energy can produce a large number of absorbing, long-lived color centers suitable for an absorption-type hologram. FIG. 4a illustrates absorption coefficients of such a layer; the dotted line represents the absorption of the unperturbed layer, the solid curve represents the F band produced by electron-ionic crystal interaction.

As the electron beam is deflected corresponding to the scanning run of the transducer (12, FIG. 1), the intensity of the beam is modulated in accordance with the holographic signal as represented by the wave front pattern locally detected by the transducer. The electron beam thus writes a hologram onto and into the crystal target layer 36 in form of variable intensity color centers. For generating a volume hologram, target 36 must be somewhat thicker and is provided by electrodes to which is applied a voltage oscillating in accordance with the above-mentioned oscillations of the transducer when mapping an interference region. The voltage thus applied causes color centers to migrate into the interior of the layer 36, the color centers being normally created only adjacent the surface of layer 36 facing the electron gun.

The frequency of the monochromatic light source used should emit a wavelength close to or equal to the center of the F band at the peak of the absorption of the particular material used. In this case, an absorption hologram is produced. The preferred mode of practicing the invention, however, utilizes a different characteristics of color center.

Figure 4B:
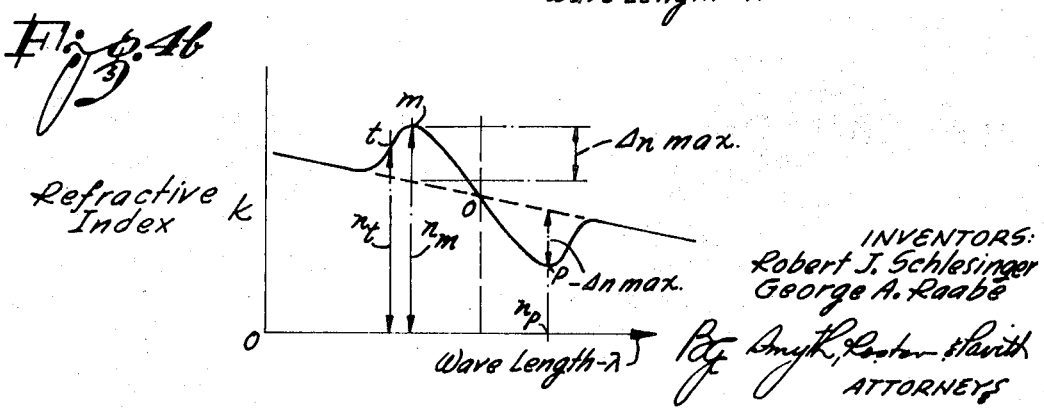

A disadvantage of a crystallite is its frosty or milky appearance when as thick as 10 microns or more. On the other hand, a thin layer reduces the color center density which can be produced so that the contrast is rather low for an absorption hologram. Moreover, a specular single crystal layer has fewer vacancies so that the color center density is reduced further. However, color centers in potassium chloride and also in potassium bromide and other materials, exhibit a change in the index of refraction within the F band. This is illustrated in FIG. 4b, plotted in alignment with FIG. 4a.

The index refraction is modified in the color center in that this index is higher than in the unperturbed state for wavelengths shorter than the absorption peak (at $\lambda o$); the index of refraction is relatively lower, for longer wavelengths. Accordingly, there is a maximum for the index of refraction at a wavelength $\lambda n > \lambda o$ and a minimum for $\lambda p > \lambda o$. If one uses a thin layer of such material at, say, one or few micron thickness, then there is little absorption by the color center for radiation having wavelength little less than $\lambda m$ or little more than $\lambda p$, but the change in index of refraction introduces a phase shift in the wave front which suffices for holographic imaging purposes.

As a local change in the index of refraction produces a relative change in phase of a wave front increment passing through, it is of advantage to eliminate from the layer the perturbations which may produce a change in phase and thus become effective as noise. Such noise can best be suppressed if the crystal layer has a perfect single crystal structure so that grown, cleaved and optically polished crystals of high purity and grown in conditions assuring high crystallinity. Aside from the materials already mentioned, mixed salts of, for example, KCL-Tl Cl or Rb Br-Rb Cl may be grown by these processes.

This phenomenon is particularly employed in the system of FIG. 2, which is the reason, for example, for using a krypton laser mentioned above and having a 0.5208 micron wavelength output. The absorption peak of the F band of KCL is dependent upon purity, temperature and history and is in the neighborhood of 0.54 through 0.56 microns. Thus, the monochromatic coherent waves employed for image reconstruction have a wavelength a little below the absorption peak wavelength, but still within the F band of, for example, KCL. The absorption of a color center is quite low at this laser wavelength, but the change in index of refraction is significant. Even a layer of 1 micron thickness potassium bromide suffices already to produce a phase shift hologram (the laser wavelength must then be somewhat higher). Moreover, it has been found that for obtaining a sufficient change in index of refraction the density of halide vacancies in the target layer can be low so that a single crystal with its natural imperfections suffices. Using a single crystal layer reduces the milky appearance, i.e., such a layer has specular rather than diffused transmission.

The phase shift hologram is considerably more efficient (higher contrast) than a transmission or absorption hologram of a layer of the like thickness. Moreover, by using the susceptor target to generate a phase hologram, a minimum electron beam current will be required to form adequately dispersive color centers in a thin layer and, therefore, beam focusing is simplified, resulting again in higher resolution.

An external heat source 37 is connected to suitable heating electrodes 38 inside of tube 25 to heat the layer 36. These electrodes heat the layer 36 primarily through infrared radiation. These or additional heating elements may be in physical contact with layer 36 to provide heating by conduction. At elevated temperatures, the color centers disperse rapidly and dissolve. This means, in effect, that the trapped electrons are permitted to migrate by thermal motion until they flow off the target. Target screen 36 should be grounded, or a suitable potential may be applied to aid in the migration of the trapped electrons.

Heating through thermal radiation and conduction suffices where the hologram frame rate is rather low or even irregular and the object changes shape or position very little in time, or where such change is not of interest, and/or where a single reconstructed image frame is to be observed for any length of time. This, for example, may be the case when the hologram is taken from the interior body of a person, and contour and shape of several organs are to be studied intensively. For a motion picture-type holographic sequence, higher frame rates are needed, and the erasing speed becomes critical. Fortunately, the stability of the color centers is likewise less of a problem for higher frame rates, as each hologram needs to last only for a fraction of a second before fading for any reason.

In case of the phase shift hologram, use can be made of the fact that color centers disperse in case strong radiation, having, for example, the center wavelength of the absorption band, is directed upon the crystal susceptor. A modified tube is illustrated in FIG. 5, having a second side entrance port through which a second laser 20a provides radiation of center frequency wavelength $\lambda_0$ of the F band and directs such radiation also onto the layer 36. That beam should have such high intensity so that the absorbing color centers are heated instantly as a result of the absorption, and this heat treatment, in turn, causes their dispersal. The direction of this erasing beam must be such that the beam cannot be observed (laser 20a should be operated intermittently) and does not or only to a negligible degree enter the image reconstruction area.

Another aspect to be considered here is the fact that the generation of trapped electron color centers by irradiating the screen with high-energy electrons is accompanied by the generation of trapped hole color centers at cation vacancies. These color centers produce the so-called V absorption band in the UV region. F and particularly $V_1$ centers are closely related and they usually occur at the same time when the screen is bombarded with electrons. As symbolically indicated in FIG. 5, two radiation sources for bleaching are needed, one providing radiation at the absorption peak frequency $\lambda_0$ for the F center, the other one providing radiation at absorption peak frequency for the $V_1$ center. The latter frequency is, as stated, in the UV range so that the UV transmitting entrance window such as a fused silicon window, is needed for CRT 20'. A strongly absorbing UV filter in front of target screen 36 can eliminate this bleaching radiation entirely from the processing and viewing range outside tube 25 and in front of screen 36.

It follows from the foregoing that with a rapid, flash-bleaching process by radiant energy hologram record or write and bleach cycles can be produced to follow each other in rapid sequence, so that the viewer actually observes a sequence of holograms making it possible to follow object changes, motions, etc., in real-time.

One of the principal advantages of the system as described is to be seen in the fact that the type of waves used for producing holographic signals can be quantitively (wavelength) as well as qualitatively (mechanical vibrations vs electromagnetic waves) differ from the radiation used for the image reconstruction from the hologram. This means that the generation of the holographic signal can be adapted to the specific environment of the object and to the particulars thereof to be examined, while the image reconstruction uses the type of radiation which offers the most convenient and the most practical form of evaluation and processing of the reconstruction. Thus, in principle, any kind of monochromatic coherent wave energy can be used to generate the interference pattern, and independently therefrom any kind of such wave energy can be used for image reconstruction, except that the wave energy used for image reconstruction must be such that a suitable susceptor is available, capable of undergoing local variations of its transmission and wave propagation characteristics upon interaction with focused radiation such as an electron beam and for the type of wave energy used for the image reconstruction process.

The single relationship to be observed between the monochromatic coherent radiation used for generating the standing wave pattern and the monochromatic radiation used for image reconstruction concerns the wavelength to be employed. For a 1:1 object size to image size relation, (i.e., for a reconstruction analogous to reconstruction from a hologram taken photographically with the same wavelength as is used for reconstruction) the total range of linear deflection of the electron beam as effective on the intercepting target 36 in one dimension must bear relation to the corresponding scan line length of the transducer 12 corresponding to the ratio of the wavelength respectively employed for mapping of the interference pattern by the transducer and for image reconstruction. For 1 mc. ultrasonic vibrations and about 0.5 micron laser light, the wavelength ratio is about $3/4 \cdot 10^3$; this then is the ratio between the scanning line length to be covered by transducer 12 and the line length as written by the electron beam in tube 25. If one meets this relation, the hologram will be constituted as if it were taken at the wavelength of the reconstruction light.

It will be appreciated that "real-time" control of the hologram producing tube is a significant advantage of the invention, but the signal controlling the electron gun 30 of tube 25 (or 25') does not have to be produced as a holographic signal by transducer 12 at the time of hologram constituting. The holographic signal may have been recorded on a linear signal recorder and played back when needed. Going one step further, the signal may have been synthesized by a computer.

In the embodiments of the invention as described thus far, the screen was energized and color centers were produced through interaction of the screen with electrons. However, sufficiently intense ultraviolet radiation can likewise be used (and, of course, radiation of still higher quantum energies). In FIG. 6, there is a source 50 of UV radiation 51, the intensity of which being controlled through the holographic signal. The beam 51 emitted by the source is deflected through a pair of orthogonally arranged prisms 52 and 53, movably positioned in the path of beam 51, and controlled as to position by the scan control signal synchronized with the scan of surveying standing wave interference patterns as described. The beam is deflected for horizontal and vertical scan (or radial and azimuthal scan) accordingly. Focusing means such as a lens or lens system 54 focus the beam onto a screen 55, essentially of the character described. However, as shown more fully in FIG. 6a, as the screen is presumed to be a relatively thick UV transparent glass having embedded and dispersed ionic crystals. Accordingly, one can distinguish within the screen among several focal planes in relation to UV lens system 54. The UV lens system 54 may be a zoom lens to establish different focal planes within the screen 55. If the (average) focal length of lens system 54 is sufficiently small, the concentration drop of radiation transverse to the focal plane will be sufficiently steep so that the radiation intensity suffices to energize crystals in the focal plane and in very close vicinity thereto. The arrows in FIG. 6a denote symbolically different focal and energization planes within target 55. Therefore, color centers can be set up in different "layers" upon varying the focal length of lens 54. The standing wave interference pattern may be scanned and surveyed in different planes and corresponding changes in the focal length of lens system 54 cause a volume hologram to be written into screen 55.

FIG. 7 illustrates another embodiment of the invention. The tube 25 is provided essentially as before except that the screen is of the type shown in FIG. 6a (or 7a). The electron beam writes a hologram on the inner surface layer only of screen 55, as the electrons will be rapidly absorbed by the host material for the dispersed ionic crystals. Thus, color centers are created only in ionic crystals. Thus, color centers are created only in ionic crystals near the surface of screen 55; crystals in the interior thereof remain unaffected.

A matched filter hologram 61 is positioned in particular relationship to the screen 55 of the tube 25 and illuminated by a UV source 60. A UV lens 62 (or zoom lens system) images the hologram 61 into a plane of screen 55 to generate color centers therein. The view of the object represented by the holographic signal controlling source 50 is similar to the object view holographically recorded previously onto record 61. Thus, there are two holograms juxtaposed within screen 55. A lens 63 is positioned at a distance equal to its focal length from screen 55 and reproduces the laser source as a bright spot of light on the other side of lens 63 at focal length distance therefrom. If the hologram 61 is unrelated to the holographic signal, such spot of light will not be reproduced.

A detector 64 responds to presence or absence of the spot as a representation of matching or not matching holograms. Hologram 61 may be one of a plurality of reference holograms recorded on a film reeled through the object plane of lens 62. Before a new hologram is reconstructed into a particular plane of screen 55, the screen must be erased. The holographic signal may have been recorded on tape or otherwise, and the record is played back for control of source 50, after erasure of screen 55, for rerecording thereon the information hologram as the next reference hologram is imaged on the screen.

However, selective erasing is possible if the screen is a composite one. For example, in FIG. 7a is illustrated a thin layer 55a with dispersed crystals, provided to be responsive to electrons for color center creation. Alternatively it could be similar to the layers 36 discussed above. An inner layer 56 is provided as electrically insulating material, such as glass. This may be the host material for layer 55a without dispersed crystals. A thin layer 57 made of metal but being sufficiently thin to remain transparent is provided to serve as an electrode. Another layer 55b of or including ionic crystals is provided next and there may be a second thin, metallic electrode layer 58 to complete the system of layers.

The electron beam writes a hologram into layer 55a in accordance with the holographic signal. UV light, for example, flashes a reference hologram onto layer 55b, as explained with reference to FIG. 7. For changing the reference hologram, an electric potential is applied between electrodes 57 and 58, causing the color centers to migrate towards the more positive electrode, and as the previously trapped electrons flow off the layer 55b, color centers disappear therefrom, while those in layer 55a remain.

This embodiment serves as representation of two aspects of the invention; a hologram can be constituted or reconstituted on a susceptor screen by flash imaging, i.e., without scanning-type mapping. Furthermore, different holograms can be superimposed upon the same screen.

Turning now to FIG. 8, there is illustrated a somewhat different arrangement which can be interpreted as a portion of the transmission link between the holographic signal generating system (FIG. 1) and the image reproduction system (FIG. 2). The arrangement illustrated in FIG. 6 is a scan conversion system. The cathode ray tube 40 illustrated in FIG. 6 has two electron guns 41 and 42. The electron gun 41 receives the transducer signal and the beam deflection system 43 is controlled in synchronization with the holographic signal generation and interference pattern scanning process. The screen 45 of the CRT 40 is of the material mentioned above. Generally, it must be of the type which undergoes stable but erasable perturbation when interacting with an electron beam, for example, a high-energy electron beam.

The requirements for the perturbations in general differ here from the ones mentioned above to some extend; the material should become fluorescent where having interacted with a high energy electron beam when subsequently interacting, for example, with a low-energy beam. It has been found, however, that color centers in ionic crystals mentioned above possess these characteristics; they become fluorescent when interacting with a low energy electron beam. The second electron gun is provided for this purpose. Thus, the fast electron beam writes a hologram upon screen 45, and the slow electron beam excites the color centers to become fluorescent. The electron beam emitted from gun 42 is deflected by its own deflection system and may thus be controlled completely asynchronously to the operation of deflection control 44.

A photomultiplier 46 is positioned adjacent to screen 45 to furnish a line scan signal in accordance with the scanning operation as controlled by device 44. The signal generated by photo detector 46 is again a holographic signal and can be used to control the electron gun for the CRT 25 employed for the image reconstruction. Inasmuch as the screen 45 is erasable in the same manner as is screen 36 (FIG. 3) sequences of holograms can be scan-converted with little delay between the hologram mapping and conversion process. Alternatively, the photomultiplier could be installed in a third neck of tube 40. This will be of advantage, if the contemplated scan conversion is an additional process, still permitting observation of the screen 45 or even illumination with coherent radiation for holographic processing as described.

The invention is not limited to the embodiments described above, but all changes and modifications thereof not constituting departures from the spirit and scope of the invention are intended to be covered by the following claims: We claim:

1. Apparatus for constructing in real time a hologram from an electronic signal containing holographic information, said apparatus comprising in combination:

a cathode-ray tube having a front port and a rear port aligned along an axis, said ports being suitable for passing the monochromatic coherent beam generated by a laser, said cathode-ray tube including an electron gun, said electron gun mounted so as to project an electron beam along an axis that is generally at an acute angle with respect to the axis defined by said front and rear ports, said electron gun including deflection means for deflecting said electron beam, said electron gun being connected so that the electronic signal containing holographic information controls the intensity of said electron beam;

a laser mounted so as to project a monochromatic coherent beam through said cathode tube via said front and rear ports;

a target having front and rear surfaces and mounted in said cathode ray tube between said front and rear ports so that the monochromatic coherent beam generated by said laser passes through said target and so that said electron beam projected by said electron gun impinges on and scans the rear surface of said target, said target including:

a first layer of alkali halide crystals which respond to the electrons making up said electron beam, said response being such that the characteristics of said target vary, the variation in characteristics causing a variation in the wave front of the monochromatic coherent beam generated by the laser and passing through said front and rear ports and said target whereby a hologram is created on said target;

a layer of electrical insulating material formed on one surface of said first layer of alkali halide crystals;

a first metal layer formed on the other surface of said layer of electrical insulating material, said first metal layer being sufficiently thin to remain transparent to the monochromatic coherent beam generated by said laser;

a second layer of alkali halide crystals formed on the other surface of said first metal layer; and, a second metal layer formed on the other surface of said second layer of alkali halide crystals, said second metal layer being sufficiently thin to remain transparent to the monochromatic coherent beam generated by said laser;

erasing means coupled to said target for erasing the hologram formed thereon by the action of said electron beam impinging on the rear surface of said target;

a UV source mounted so as to direct a UV beam toward the front face of said target; and, a UV lens system mounted between said UV source and said front surface of said target for imagining a reference hologram located between said UV lens system and said UV source onto the front surface of said target.

* * * * *